US008130429B2

(12) United States Patent
Ferlitsch

(10) Patent No.: US 8,130,429 B2
(45) Date of Patent: Mar. 6, 2012

(54) ADAPTIVE DRIVER FOR CHOOSING HYBRID RASTER AND PDL FORMAT OUTPUT

(75) Inventor: Andrew Rodney Ferlitsch, Tigard, OR (US)

(73) Assignee: Sharp Laboratories of America, Inc., Camas, WA (US)

( * ) Notice: Subject to any disclaimer, the term of this patent is extended or adjusted under 35 U.S.C. 154(b) by 972 days.

(21) Appl. No.: 11/145,055

(22) Filed: Jun. 2, 2005

(65) Prior Publication Data

US 2006/0274345 A1    Dec. 7, 2006

(51) Int. Cl.
*G03F 3/10* (2006.01)
(52) U.S. Cl. ........................................................ 358/527
(58) Field of Classification Search .................. 358/527, 358/1.15; 345/441; 395/116
See application file for complete search history.

(56) References Cited

U.S. PATENT DOCUMENTS

| | | | | |
|---|---|---|---|---|
| 5,471,564 | A | * | 11/1995 | Dennis et al. ................. 358/1.15 |
| 5,704,021 | A | | 12/1997 | Smith et al. |
| 5,913,018 | A | * | 6/1999 | Sela .............................. 358/1.17 |
| 5,930,469 | A | * | 7/1999 | Chiarabini et al. ........... 358/1.17 |
| 5,960,166 | A | | 9/1999 | Brown, III et al. |
| 5,978,560 | A | * | 11/1999 | Tan et al. ...................... 358/1.15 |
| 5,987,226 | A | * | 11/1999 | Ishikawa et al. .............. 358/1.13 |
| 6,571,009 | B1 | | 5/2003 | Nielsen et al. |
| 6,850,335 | B1 | * | 2/2005 | Barry et al. ................... 358/1.15 |
| 7,102,779 | B2 | * | 9/2006 | Lester et al. .................. 358/1.15 |
| 2002/0080370 | A1 | | 6/2002 | Shishido |
| 2002/0097418 | A1 | | 7/2002 | Chang et al. |
| 2003/0038959 | A1 | | 2/2003 | Kuroi |

(Continued)

FOREIGN PATENT DOCUMENTS

EP        0959404 A2      11/1999

(Continued)

OTHER PUBLICATIONS

"The Sharp AR-507 Imager™ Workgroup Digital Document System: High Performance Technology That Delivers," at least as early as May 28, 2005, 2 pages, Sharp, Mahwah, NJ.

(Continued)

*Primary Examiner* — Benny Tieu
*Assistant Examiner* — Jeremiah Bryar
(74) *Attorney, Agent, or Firm* — Law Office of Karen Dana Oster, LLC

(57) ABSTRACT

An adaptive print driver receives printing instructions relating to a document and outputs print data pages to an imager. The adaptive print driver includes a printing instruction parser for parsing printing instructions, a format controller for assigning a data format to the parsed print instructions and transferring the parsed print instructions according to the data format to a plurality of format generators. The plurality of format generators generates print data which is passed to a coalescer that coalesces the received print data into at least one print data page. The adaptive print driver uses a data format determination analysis process to balance rasterization on the adaptive print driver to achieve an optimal load balance between rasterization to take place on the adaptive print driver and rasterization to take place on the imager. The data format determination analysis considers the complexity of the document as well as information pertaining to the performance capabilities of the host, the performance capabilities of the imager, the load capacity of the host, and the load capacity of the imager, if such information is available. The present invention is also directed to a method for preparing a document for imaging on an imager.

21 Claims, 11 Drawing Sheets

U.S. PATENT DOCUMENTS

| | | |
|---|---|---|
| 2003/0184799 A1 | 10/2003 | Ferlitsch |
| 2003/0227639 A1 | 12/2003 | Ferlitsch |
| 2004/0061892 A1 | 4/2004 | Ferlitsch |
| 2004/0145586 A1* | 7/2004 | Jacobsen ................. 345/441 |
| 2005/0068343 A1 | 3/2005 | Pan et al. |
| 2005/0099649 A1 | 5/2005 | Ferlitsch et al. |
| 2005/0146742 A1* | 7/2005 | Gregory .................. 358/1.15 |

FOREIGN PATENT DOCUMENTS

| | | | |
|---|---|---|---|
| EP | 1176549 A2 | 1/2002 | |

OTHER PUBLICATIONS

"HP DeskJet 870C Series Specifications," at least as early as May 30, 2005, 2 pages, http://www.printerworks.com/DataSheets/DJ870C.html.

"AR M 277: Raise Productivity to a Whole New Level," 2003, 2 pages, Sharp Electronics Corporation, Mahwah, NJ.

"AR-M450 Digital Laser Printer: High-Security Solutions for the Digital Age," 2003, 8 pages, Sharp Corporation, Oska, Japan.

* cited by examiner

ADAPTIVE DRIVER FOR CHOOSING HYBRID RASTER AND PDL FORMAT OUTPUT

BACKGROUND OF INVENTION

The present invention is directed to a print driver, and more specifically to an adaptive driver for choosing hybrid raster and PDL format output.

When a user chooses to print, copy, fax, file, or otherwise image (hereinafter referred to as "image") a document 100 (that can include all input sources that would require rasterization before printing, examples of which include electronic documents, electronic image files), a conversion of the document or image data (hereinafter referred to as "document data 102") must be performed at some point on a group of connected devices (networked or local) such that the document data 102 eventually is converted into a raster image 104a, 104b. Connected devices might include a single host 110 and a single imager 112. More complicated networks include multiple hosts 100 and/or multiple imagers 112. For purposes of the present invention, a host 110 may be any device from which imaging may be requested, including, but not limited to a computer, a workstation, a PDA, server, another imager, and other document data sources known or yet to be discovered. For purposes of the present invention, an imager 112 may be any device at which imaging may be implemented, including, but not limited to an MFP (Multi-Function Peripheral/Printer/Product), a printer, a facsimile machine, a copier, a scanner, a filing device, a document conversion device, or any imaging device known or yet to be discovered.

The conversion of document data 102 into a raster image (shown as raster data 104a, raster page 104b, and/or raster graphics 104c) may be a multi-stage process. A first stage may be, for example, to convert the document data 102 into device independent data that is generally represented as graphical instructions (e.g. graphical display interface (GDI) format in Microsoft's Windows®). A second stage may be, for example, to convert the device independent data to a page description language (PDL) (e.g. Postscript® (Adobe Systems, Inc.), printer control language (PCL) (Hewlett-Packard), portable document format (PDF) (Adobe Systems, Inc.—Acrobat®), PCL-6 or PCL-XL, IBM IPDS, and other PDLs known or yet to be discovered.) The device independent data and/or page description language (PDL) may then be converted into a raster image 104a, 104b using a process generally referred to as rasterization. A raster image 104a, 104b is generally in a format that is compatible with the marking engine 114 of the imager 112. Rasterization is a resource intensive process that tends to slow down the connected device on which it is being performed. The rasterization process may include, for example, converting the device independent data into a bitmap, possibly resizing/rotating the bitmap, color conversion to the imager's color space, image enhancements, and finally half-toning. Rasterization is also known as raster image processing (RIP).

In one known method the document data 102 is fully rasterized on the host 110 (FIG. 1). Another known method fully rasterizes the document data 102 on the imager 112 (FIG. 2). Other known methods divide the rasterization process so that some of the rasterization process is performed on the host 110 and the remainder of the rasterization process is performed on the imager 112 (FIGS. 3-5).

FIG. 1 shows one method in which the document data 102 is fully rasterized on the host 110. In this method, the document data 102 is first converted to a device independent format in the host side print subsystem 116. The device independent format is then converted by a host side RIP imager driver 120 (e.g. a raster printer driver) into raster data 104a that is compatible with the marking engine 114 of the targeted imager 112. The HP DeskJet 870 series printers are examples of devices in which the document data 102 is fully rasterized on the host 110.

One drawback of fully rasterizing on the host 110, depending on the resource capabilities/availability, is that the host 110 may become bogged down, depriving its ability to process other operations in parallel and/or causing delays in starting subsequent operations. One benefit of fully rasterizing on the host 110 is that the imager 112 does not require any image processing capabilities, since the data is already in a marking engine 114 ready format (raster data 104a), and the marking engine 114 can be driven at its full marking engine speed (i.e. rated speed).

FIG. 2 shows another method in which the document data 102 is fully rasterized on the imager 112 by a RIP processor 122. Typically, the document data 102 is first converted to a device independent format on the host 110 by the host side print subsystem 116. The host side print subsystem 116 may then convert the device independent format into page description language (PDL) data 124 that is supported by the imager 112. Converting device independent format into page description language (PDL) is generally a much faster operation than rasterization, since the printing instructions are generally simply converted from one format to another, with little to no image processing occurring. The PDL data 124 is then transferred from the host 110 to the imager 112. The RIP processor 122 then converts the PDL data 124 into raster data 104a that is compatible with the marking engine 114. The Sharp AR-M450 is an example of an imager 112 where the document data 102 is fully rasterized on the imager 112.

One advantage to performing rasterization on the imager 112 is that the host 110 requires substantially less computing resources, allowing the host 110 to have a substantially greater ability to process other operations in parallel and start subsequent operations sooner. One disadvantage is that the imager 112 must now have the image processing capabilities and computing resources to convert the PDL data 124 into raster data 104a. Generally, because of the computing expensive nature of the rasterization operation, an imager 112 generally cannot rasterize data at a speed sufficient enough to drive the imager 112 at its full marking speed.

FIG. 3 shows a prior art embodiment in which some of the rasterization process is performed on the RIP imager driver 130 of the host 110 and the remainder of the rasterization process is performed on the RIP processor 132 of the imager 112. In this method the document data 102 is partially rasterized on the RIP imager driver 130 of the host 110 into a device independent bitmap format (shown as raw raster (TIFF) 134). The device independent bitmap 134 is then processed by the RIP processor 132 of the imager 112 into fully rasterized raster data 104a by performing the remaining processing steps of resizing/rotating the bitmap, color conversion to the imager's color space, image enhancements, and half-toning. The Sharp AR-M277 is an example of an imager 112 where the document data 102 is partially rasterized as a device independent bitmap 134 on the host 110 and the remaining rasterization of the device independent bitmap 134 occurs on the imager 112.

One advantage of this method is that the computing resources required for rasterization are split across both the host 110 and imager 112. Therefore, an arbitrary host 110 is more likely to produce the device independent bitmap 134 without being bogged down, or causing delays in subsequent operations, and the imager 112 is more likely to image at marking engine speed. Depending on the complexity of the device independent bitmap 134, at a certain threshold of complexity, the computing resources required will either bog down the host 110 or cause the imager 112 to image below marking engine speed, or both.

FIG. 4 shows another method that is disclosed in U.S. patent application Ser. No. 10/261,885 (Publication No. 2004/0061892 A1), entitled Load Balancing Distributed Raster Image Processing, the disclosure of which is incorporated herein by reference. In this method the rasterization of pages is split between the RIP imager driver 140 of the host 110 and the RIP processor 142 of the imager 112. That is, some pages are fully rasterized on the RIP imager driver 140 of the host 110, while other pages are fully rasterized on the RIP processor 142 of the imager 112. In this method, the host 110 uses two rendering methods, one that generates fully rasterized pages (raster pages 104b) and another that generates unrasterized PDL pages (144). The rasterized and PDL pages are then interleaved 104b, 144. As shown in decision block 146, the imager 112 side makes a determination as to whether a particular page has been rasterized. The imager 112 side then processes each page according to whether it is a raster page 104b or a PDL page 144. If the page has been rasterized, it goes straight to the marking engine 114. If the page has not been fully rasterized, the PDL page 144 goes through the PDL interpreter (a subcomponent of the RIP processor 142), where it is rasterized and then passed to the marking engine 114.

Either a static or a dynamic decision making process may be used to determine which pages are rasterized and which pages are left as PDL pages. In the static case, a predefined algorithm is used, such as round robin. In the dynamic case, a communication link exists between the imager 112 and host 110. The imager 112 self monitors its load and communicates back to the host 110 when to send pages as rasterized or PDL pages.

FIG. 5 shows another method in which some types of graphical instructions (e.g. font glyphs) are fully rasterized on the RIP imager driver 150 of the host 110, while the remainder of the instructions are fully rasterized on the RIP imager driver 152 of the imager 112. For example, the Sharp AR-507 printer driver has the option to generate text either as vector data (i.e. non-raster) or as rasterized font glyphs. The remaining graphical instructions (e.g. draw line, fill, etc.) are not rasterized. In this method, when the RIP imager driver 150 processes a text instruction, the RIP imager driver 150 obtains the font glyphs for the text, fully rasterizes the font glyphs as raster graphics 104c, and downloads them embedded with the PDL 154, while the print job as a whole is output in a PDL format. The imager's PDL interpreter (a subcomponent of RIP imager driver 152) is spoofed by passing the raster font glyphs as PDL bitmap data. When the PDL interpreter processes the PDL bitmap for the font glyph it performs no rasterization since the font glyphs were half-toned by the driver and appear as bi-tonal data to the PDL interpreter (e.g. the Sharp AR-507 printer does not perform rasterization on bitmaps that are bi-tonal). In FIG. 5 this is shown as the PDL 154 with embedded raster graphics 104c being parsed 154 such that the PDL 154 is sent to the RIP imager driver 152 of the imager 112 for rasterizing. The raster graphics 104c, however, bypass processing of the RIP imager driver 152. The raster data 104a (the rasterized PDL 154) and the raster graphics 104c are then assembled on a page-by-page basis 158 into raster pages 104b and sent to the marking engine 114.

BRIEF SUMMARY OF THE INVENTION

The present invention is directed to a print driver, and more specifically to an adaptive driver for choosing hybrid raster and PDL format output. There is a desire for an effective method of dynamically partially rasterizing a document on a host and the remainder on the imager to achieve an optimal load balance.

The present invention is directed to an adaptive print driver for receiving printing instructions relating to a document and outputting print data pages to an imager. In one preferred embodiment, the adaptive print driver includes a printing instruction parser, a format controller, a plurality of format generators, and a coalescer. The printing instruction parser parses printing instructions to create parsed print instructions. The format controller assigns a data format to the parsed print instructions and transfers the parsed print instructions according to the data format to the plurality of format generators. Each format generator generates print data from the received parsed print instructions. The coalescer coalesces the received print data into at least one print data page.

The adaptive print driver uses a data format determination analysis process to balance rasterization on the adaptive print driver to achieve an optimal load balance between rasterization to take place on the adaptive print driver and rasterization to take place on the imager. The data format determination analysis considers the complexity of the document as well as information pertaining to the performance capabilities of the host, the performance capabilities of the imager, the load capacity of the host, and the load capacity of the imager, if such information is available.

The present invention is also directed to a method for preparing a document for imaging on an imager.

The foregoing and other objectives, features, and advantages of the invention will be more readily understood upon consideration of the following detailed description of the invention, taken in conjunction with the accompanying drawings.

DETAILED DESCRIPTION OF THE INVENTION

Figure 1:
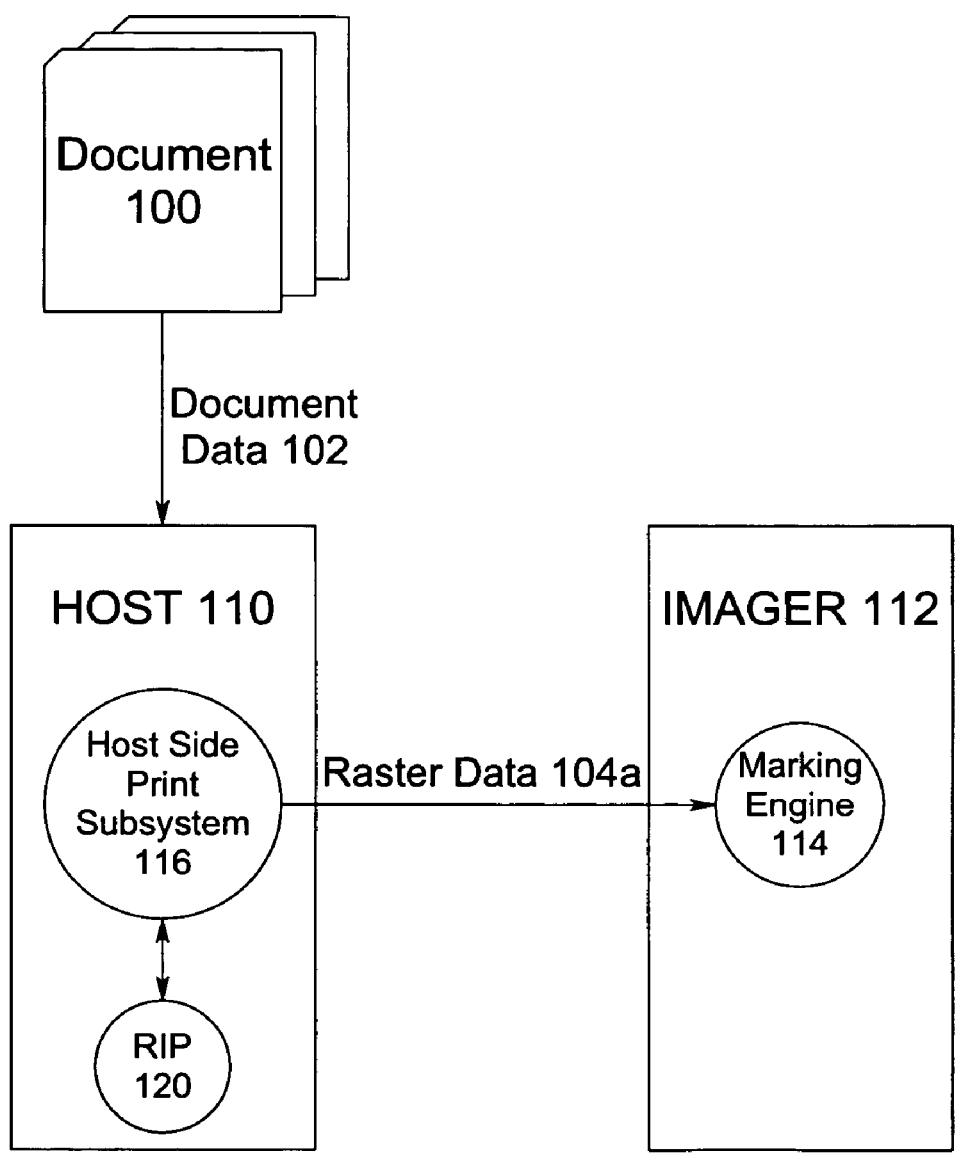
FIG. 1 is a schematic diagram of a prior art embodiment of a system in which document data is fully rasterized on the host.
Figure 2:
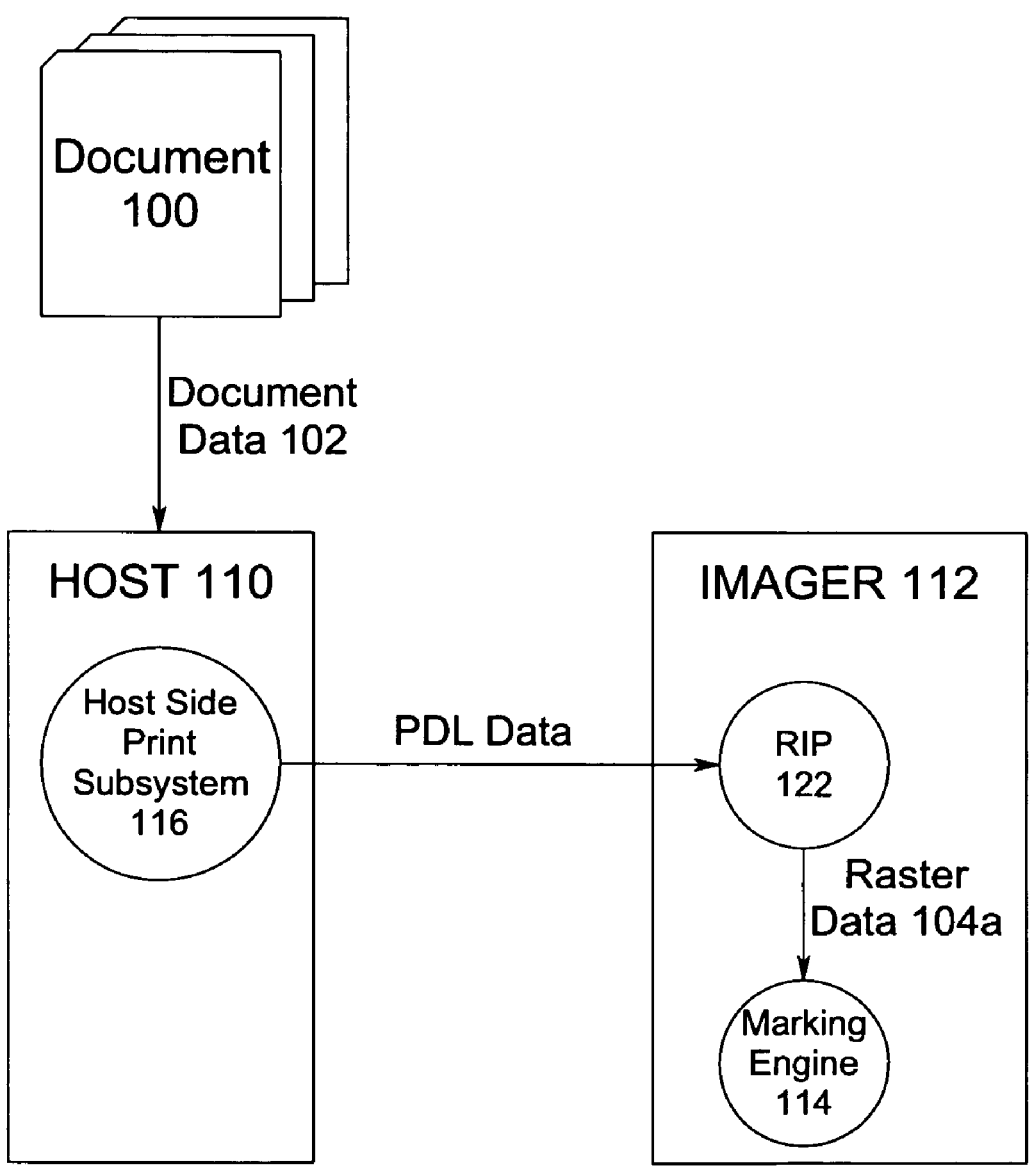
FIG. 2 is a schematic diagram of a prior art embodiment of a system in which document data is fully rasterized on the imager.
Figure 3:
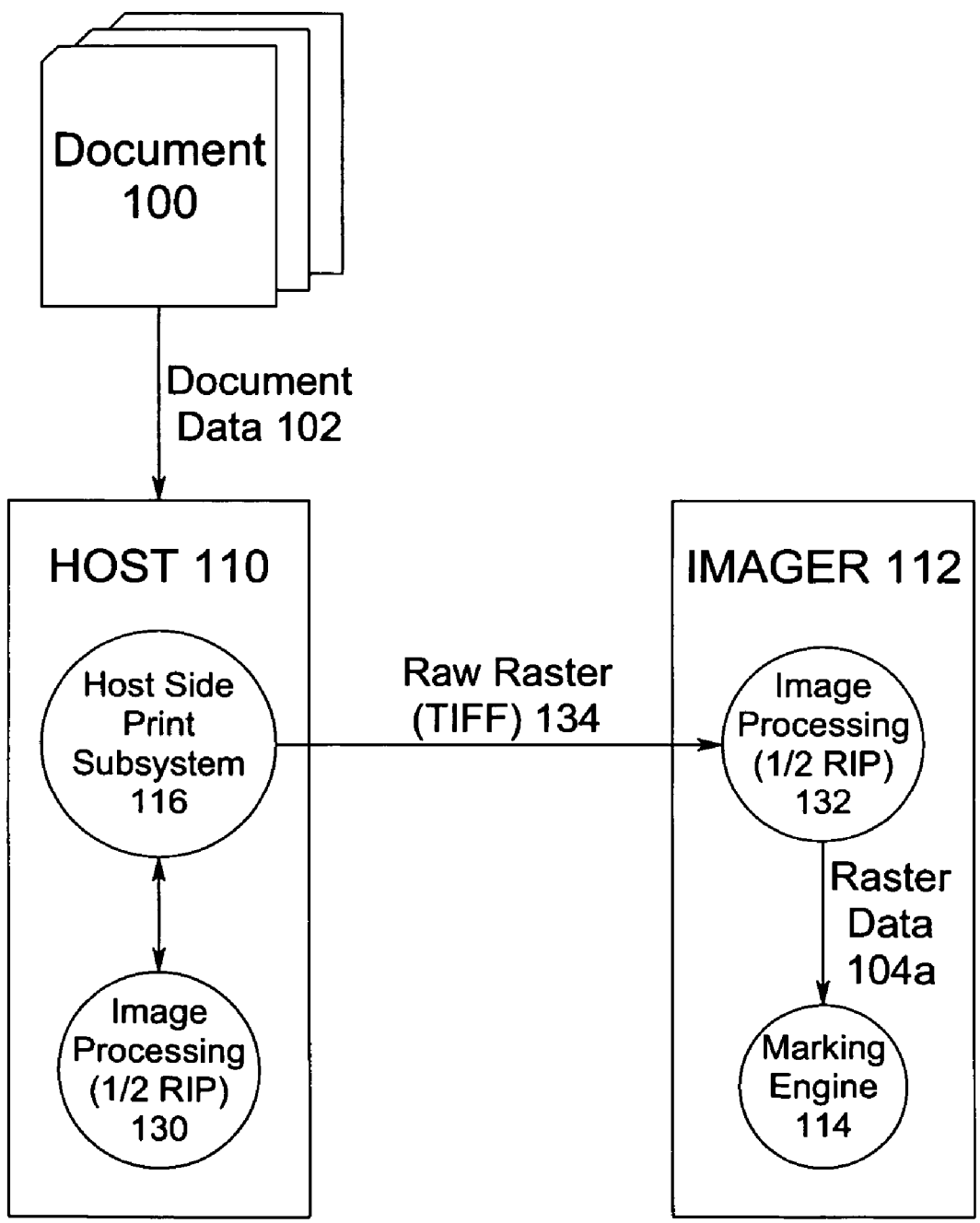
FIG. 3 is a schematic diagram of a prior art embodiment of a system in which rasterization of document data is divided between the host and the imager, and more specifically to a system in which rasterization is arbitrarily split between the RIP imager driver of the host and the RIP imager driver of the imager.
Figure 4:
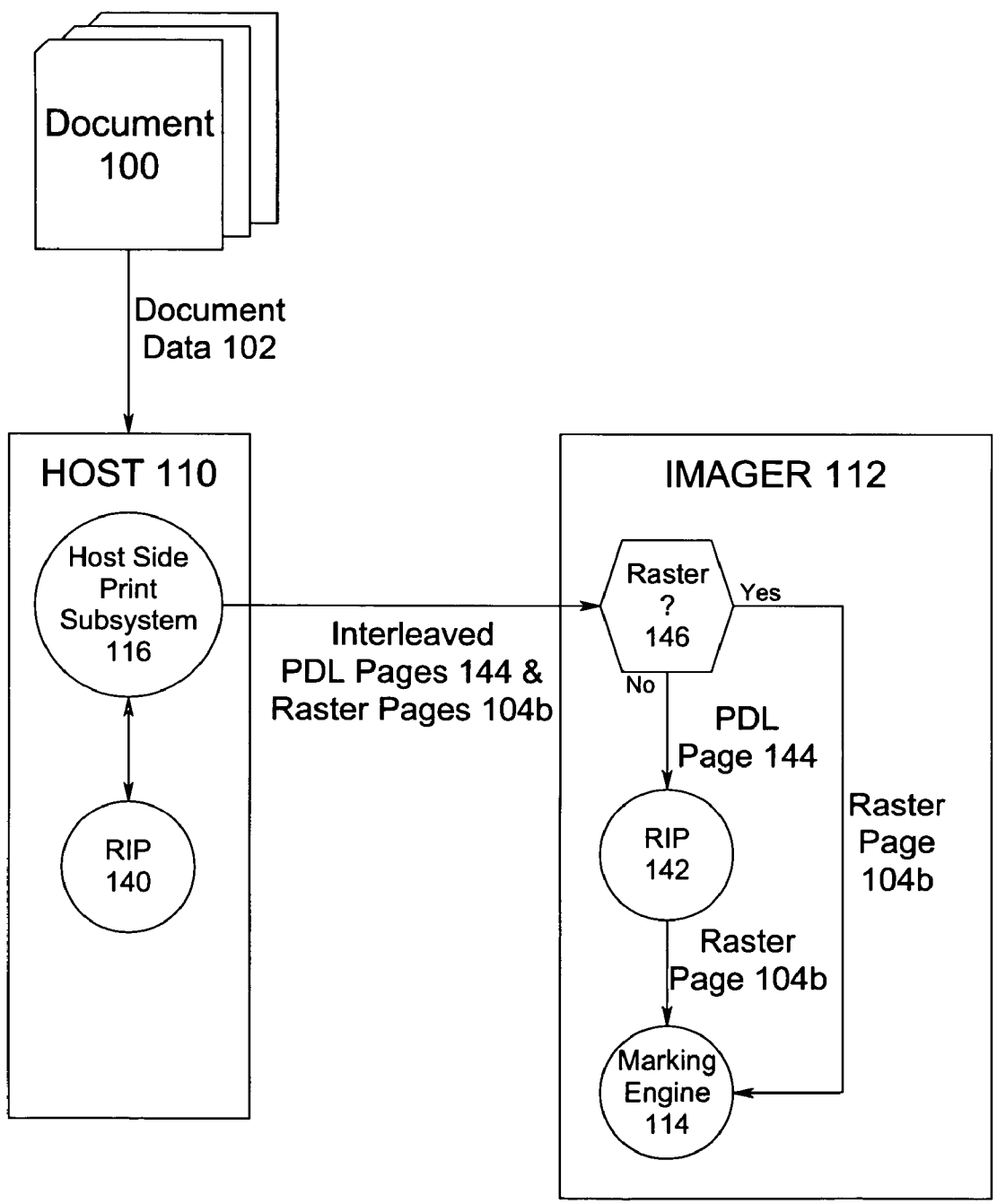
FIG. 4 is a schematic diagram of a prior art embodiment of a system in which rasterization of document data is divided between the host and the imager, and more specifically to a system in which rasterization of pages is split between the RIP imager driver of the host and the RIP imager driver of the imager.
Figure 5:
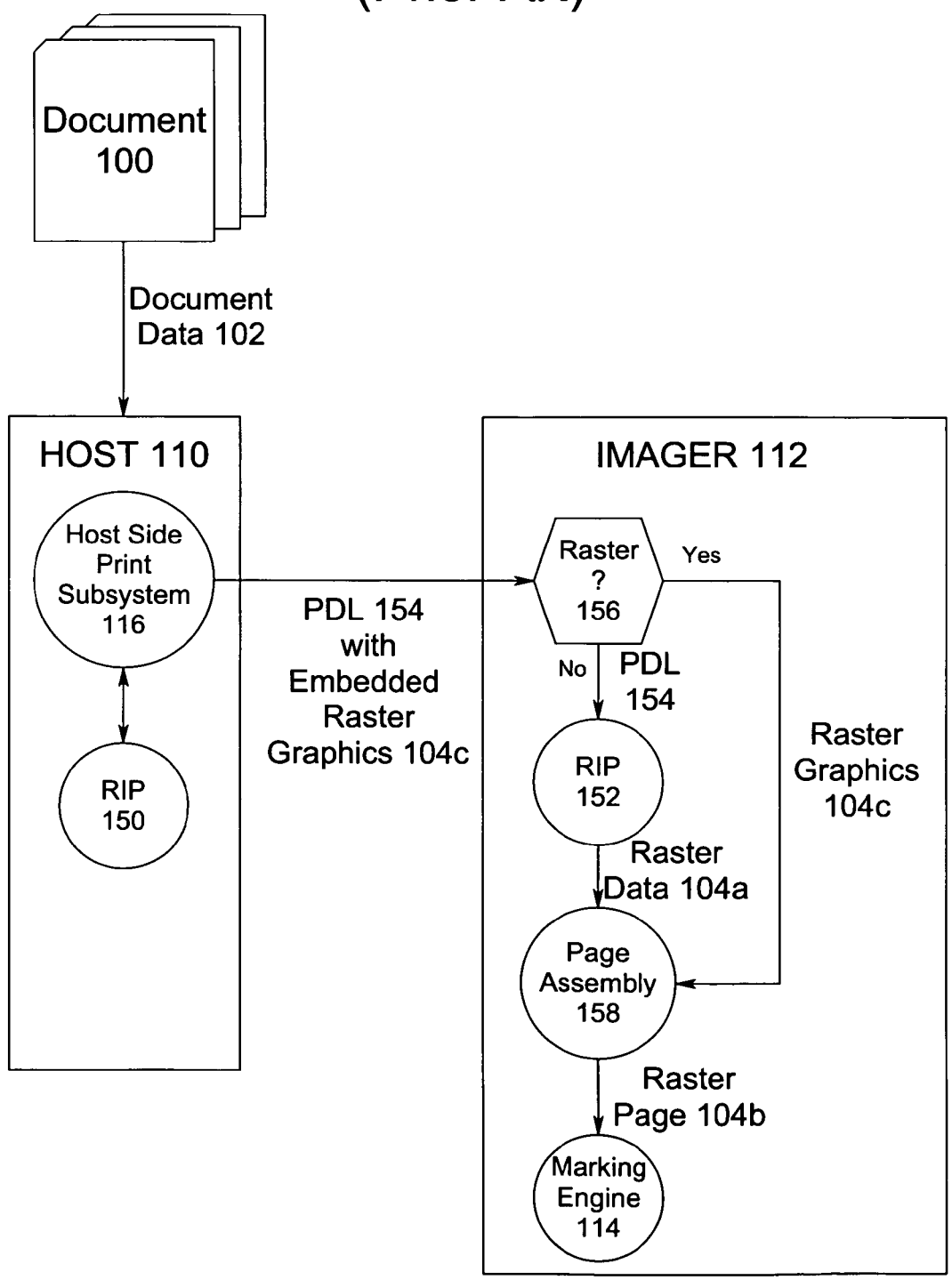
FIG. 5 is a schematic diagram of a prior art embodiment of a system in which rasterization of document data is divided between the host and the imager, and more specifically to a system in which some types of graphical instructions are fully rasterized on the RIP imager driver of the host, while the remainder of the instructions are fully rasterized on the RIP imager driver of the imager.

The present invention is directed to an adaptive print driver 260 (FIG. 6) for dynamically choosing hybrid raster and PDL format output. Using the adaptive print driver 260, the present invention provides an effective system and method of dynamically partially rasterizing document data 202 on a host 210 and outputting the result as print data pages 204. The print data pages 204 are then transmitted to an imager 212 where the remainder of the rasterization takes place. An optimal load balance between the rasterization taking place on the host 210 and the imager 212 is achieved using a data format determination analysis process 270 (FIG. 7) for choosing print data formats. The analysis process 270 preferably takes into consideration the performance capabilities 272 of the host 210 and imager 212, the load capacities 274 of the host 210 and imager 212, and the complexity 276 of the document 200 (e.g. the document data 202 and/or device independent data 206). If the imager's performance capabilities 272 and the load capacities 274 are to be considered in the analysis process 270, the adaptive print driver 260 should be able to query or otherwise communicate with the imager 212. Although the adaptive print driver 260 of the present invention is able to function with any imager 112, it is particularly suited to work with an imager 212 having an exemplary imager controller 280.

Figure 6:
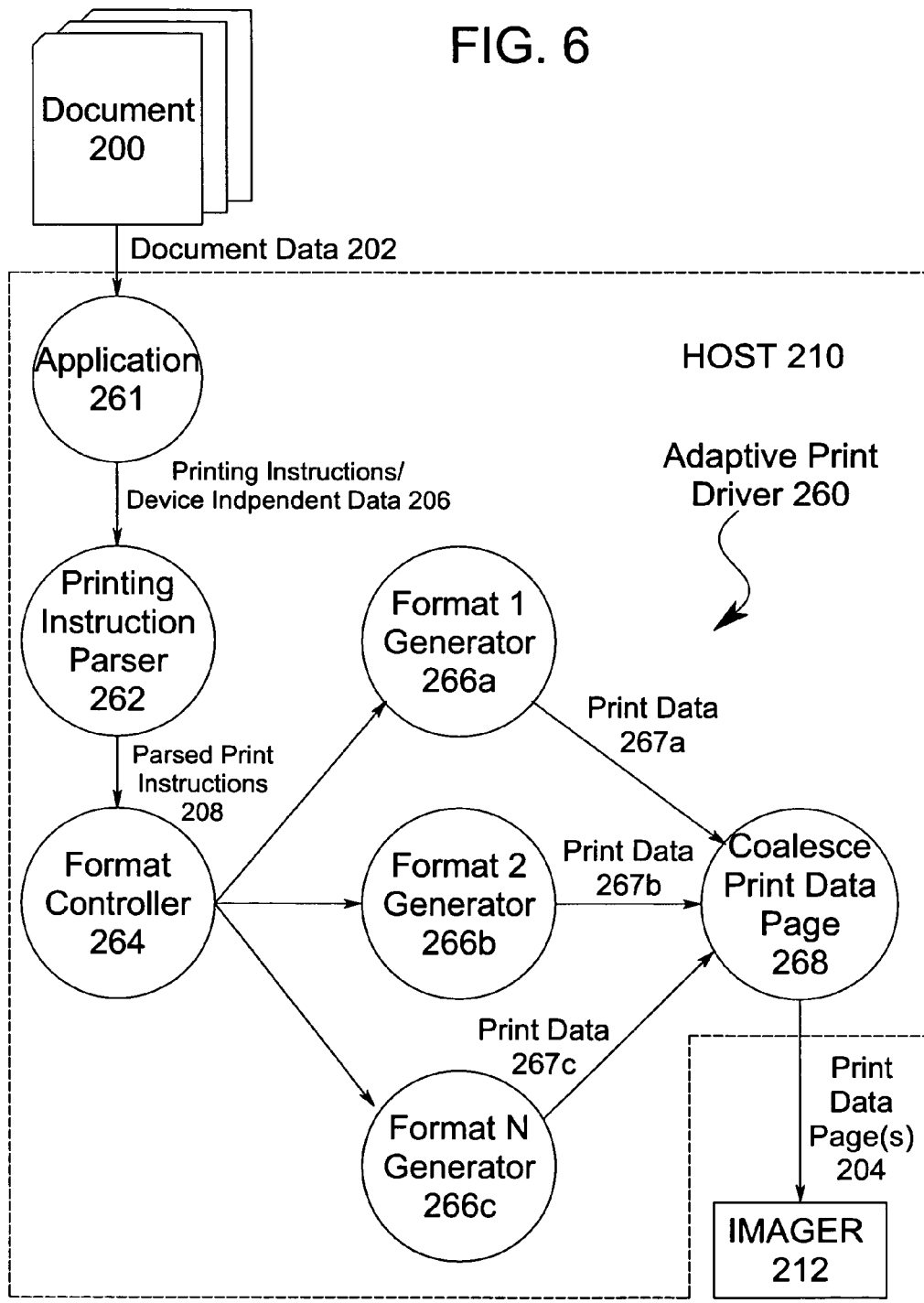
FIG. 6 is a schematic diagram of an exemplary embodiment of an adaptive print driver that provides an effective system and method of dynamically partially rasterizing document data.

As shown in FIG. 6, the adaptive print driver 260 may include a printing instruction parser 262, a format controller 264, a plurality of format generators 266a, 266b, 266c, and a coalescer 268. These elements may be implemented using hardware and/or software. The elements may be separate modules or may be components of a larger system. For example, each generator may be implemented as a separate processor, as a plurality of separate programs that execute on a single processor, or as a plurality of subprograms in a single software program.

Using the host 210 shown in FIG. 6, the document data 202 may be converted into print data pages 204 using the following exemplary multi-step process. First, a document 200 is input as document data 202 into an application 261 (e.g. Microsoft Word®). The application converts the document data 202 into device independent data 206 (GDI) that can be thought of as printing instructions that describe the entire document 200. The device independent data 206 is received by the printing instruction parser 262. The printing instruction parser 262 reviews the printing instructions and assigns a complexity that is used in the data format determination process 270 shown in FIG. 7. This review and assignment process may be done, for example, on a "page-by-page," "band-by-band," "line-by-line," and/or "instruction-by-instruction" basis. The output of the printing instruction parser 262 is parsed print instructions 208. The parsed print instructions 208 are passed to format controller 264. The format controller 264 then assigns a data format based on the data format determination process 270 shown in FIG. 7. The data format determination analysis process 270 is accomplished using this review and assignment process. Preferably, the adaptive print driver 260 is able to query the imager 212 and the host 210 so as to be able to obtain information necessary to determine the appropriate data format. The format controller 264 assigns a data format and acts as a director, passing appropriate subsections according to their assigned data format to the appropriate format generator 266a, 266b, 266c. Each format generator 266a, 266b, 266c then handles the data format conversion. For example, format generator 266a could convert its input into print data 267a (that may be PDL instructions), format generator 266b could convert its input into print data 267b (that may be fully rasterized data), and format generator 266c could convert its input into print data 267c (that may be partially rasterized data). The print data 267a, 267b, 267c is then input into and coalesced by coalescer 268. The coalescer 268 coalesces the print data 267a, 267b, 267c into print data pages 204. The print data pages 204 are then transmitted to the imager 212.

Figure 9:
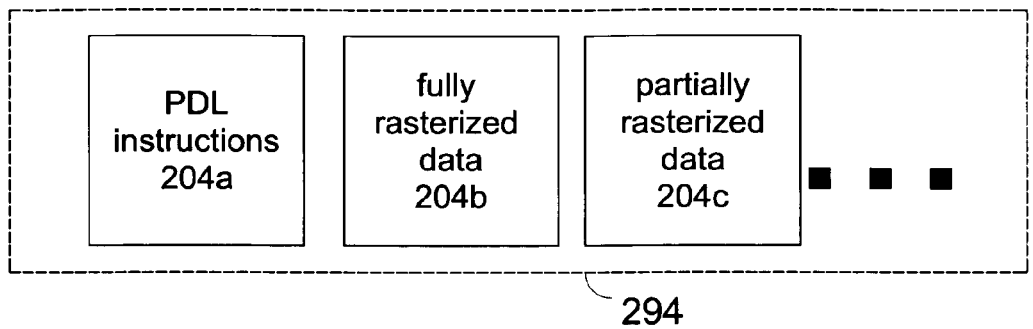
FIG. 9 is a simplified block diagram of a print job having print data pages generated as PDL instructions, fully rasterized data, and partially rasterized data.
Figure 10:
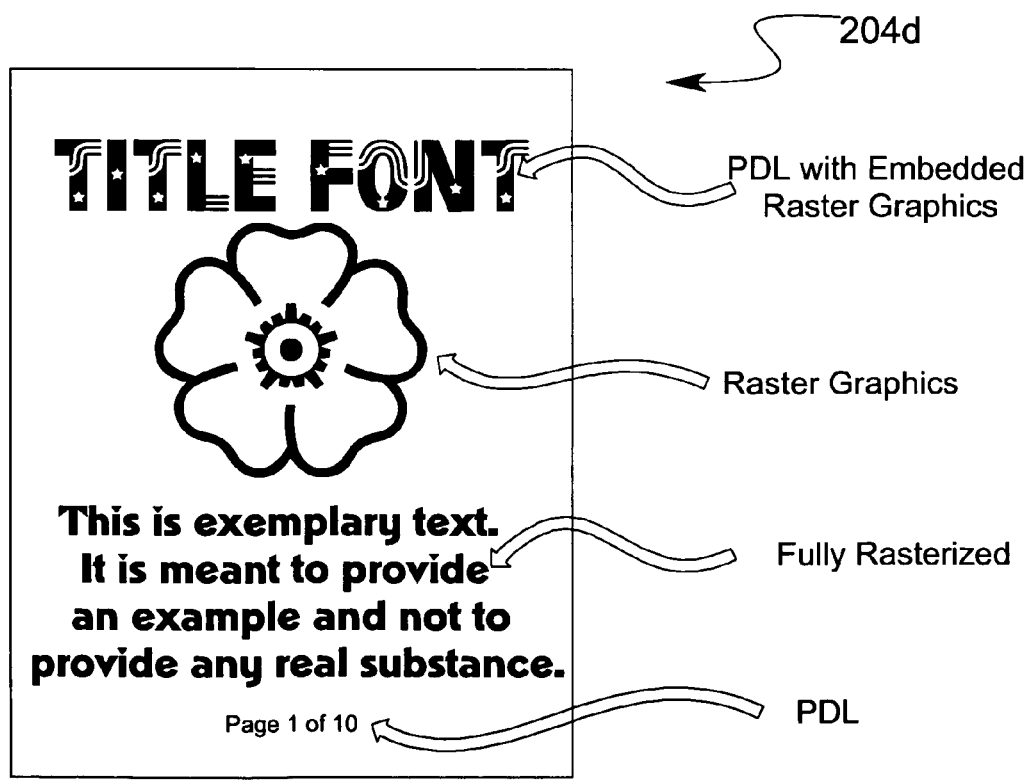
FIG. 10 shows an exemplary print data page with labels indicating multiple formats that could be used in its generation.

As shown in FIG. 9, the adaptive print driver 260 of the present invention has the capability to generate print data pages 204 in hybrid mix format PDL and raster data. For example, the adaptive print driver 260 may generate some of the print data pages 204 as PDL instructions 204a, some print data pages 204 as fully rasterized data 204b, and other print data pages 204 as partially rasterized data 204c. In the later case, the adaptive print driver 260 can also control the degree of partial rasterization. A print job 290 may have multiple print data pages 204, each having a different format. Each print data page 204 may be generated in a single format or multiple formats. FIG. 10 shows an exemplary print data page 204d describing the multiple formats (e.g. PDL, raster, partially rasterized bitmap data, and a mix of raster, partially rasterized bitmap data, and/or PDL) that could be used in its generation.

As mentioned, the printing instruction parser 262 and the format controller 264 review and assign data format using the analysis process 270. As some information regarding the document 200 would always be available, the analysis process 270 would always consider the complexity of the document 276. The format controller 264 also attempts to obtain information from the imager 212 and/or the host 210 and will use that information if it is available. Using these exemplary elements, the adaptive print driver 260 makes a determination on the format and degree(s) of rasterization to produce the print data pages 204 for a document 200 and corresponding imager 212.

The adaptive print driver 260 may make the data format determination for any degree of granularity, including, but not limited to on a print job basis (e.g. single document), on a page basis (e.g. per page in the print job), on a segment or band basis (e.g. band in a page), on a graphical instruction class (e.g. text, vector, graphics), on a graphical instruction within a class (e.g. draw circle, draw box, etc.), and/or on a graphical instruction operand attribute (e.g. bit depth or bit density in a bitmap).

The adaptive print driver 260 may make the data format determination a single time (e.g. upon logging in to a network, upon initial set up), upon initiation of the print job, or repetitively throughout the print job. If the determination is made repetitively at intervals throughout the print job, the repeated data format determinations may be made on a periodic basis (e.g. time or page basis), event basis (e.g. significant change of load on the host 210 or imager 212), and/or random basis.

Figure 7:
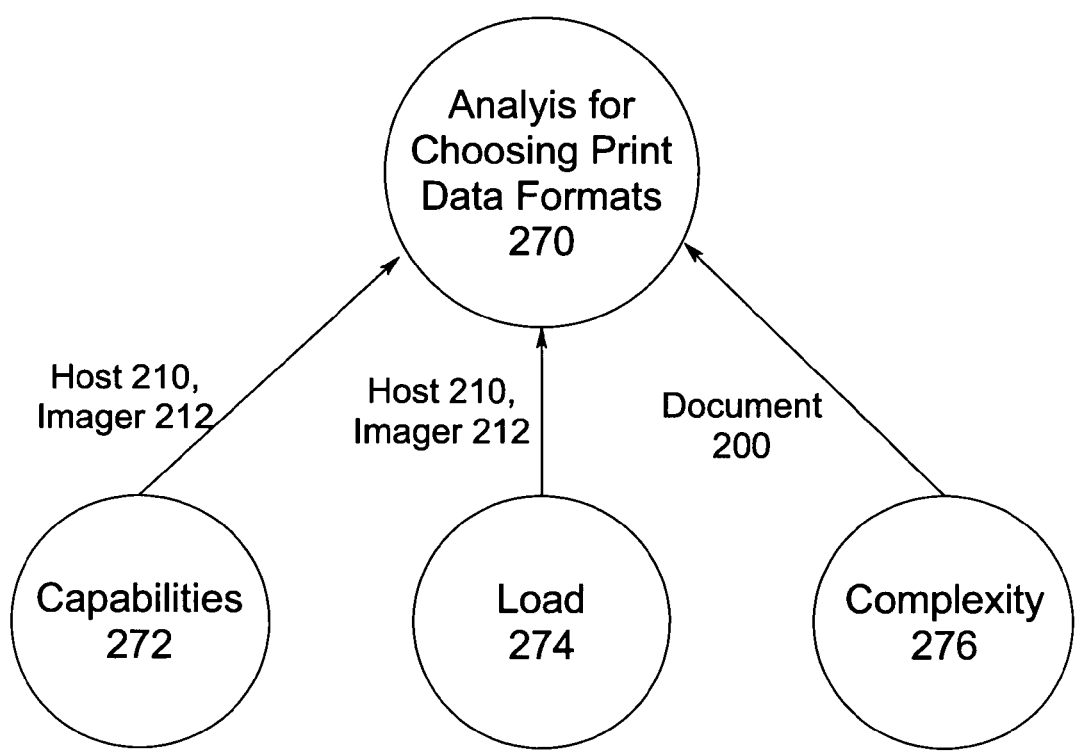
FIG. 7 is a schematic diagram showing information considered by the analysis process.

As shown in FIG. 7, an optimal load balance between the rasterization taking place on the host 210 and the imager 212 is achieved using an analysis process 270 for making the data format determination (choosing the print data formats). Preferably, the analysis process 270 takes into consideration the performance capabilities 272 of the host 210 and imager 212, the load capacities 274 of the host 210 and imager 212, and the complexity 276 of the document 200 (e.g. the document data 202 and/or device independent data 206). For example, the adaptive print driver 260 may establish a communication link with the imager 212 to determine the imager's performance capabilities and load capacities. The adaptive print driver 260 then examines the host 210 to determine the host's performance capabilities and load capacities. Based on the information available from the host 210 and imager 212, as well as the complexity 276 of the document 200, the analysis process 270 of the adaptive print driver 260 determines the best trade off of rasterization on a per print data unit basis between the host 210 and imager 212, such that both operate at near optimal conditions. A print data unit basis could be, for example, a job, a page, a band, a graphical instruction, or any N of the other print unit basis (e.g. 4 pages, 7 bands).

In the case of the host 210, the adaptive print driver 260 obtains information pertaining to the host performance capabilities and load capacity. The host 210 performance capabilities include (but are not limited to) CPU speed and RAM. The host 210 load capacity includes (but is not limited to) CPU utilization, available RAM, and number of processes running concurrently.

In the case of the imager 212, the adaptive print driver 260 obtains information pertaining to the imager performance capabilities and load capacity. The imager 212 performance capabilities include (but are not limited to) rated marking engine speed (e.g. pages per minute (PPM)), CPU, and RAM. The imager 212 load capacity includes (but is not limited to) CPU utilization, available RAM, number of non-RIP processes running concurrently, and number of RIP processes running concurrently.

In the case of the document 200, the adaptive print driver 260 considers the complexity of the document. Determinations regarding the complexity may be based on information including, but not limited to, the entire document 200, per page, per page segment and/or band, per graphical instruction class, per graphical instruction, and per graphical instruction operand. Any method for determining complexity may be used including, but not limited to byte size, bit depth, and bit density.

Finally, any method to combine these three sources of information may be used to produce a determination. For example, the system might consider weighting each factor, producing an accumulative weight for both the host 210 and imager 212. The system can then use the ratio of the host to imager weights to determine the total percentage of rasterization to split across the host 210 and imager 212. Then, the document complexity can be used to decide how to distribute the rasterization.

Additionally, the system may tune itself (e.g. weighting of factors) by monitoring whether or how close the job is outputting on the imager's 212 rated marking engine speed. For example, the driver could establish a bidirectional communication link (e.g. RAW 9100) with the imager to obtain notifications each time a sheet is output (e.g. PJL USTATUS).

In an exemplary data format determination, the adaptive print driver 260 could decide to process a print job as follows: for every group of 3 pages, the first page is always generated as PDL data, the second page is always generated as fully rasterized data, and the third page is always generated as partially rasterized data where the degree of rasterization is dependent on the complexity of the page.

Imager

Although the adaptive print driver 260 of the present invention is able to function with any imager 112, it is particularly suited to work with an imager 212 having an exemplary' imager controller 280. An exemplary imager 212 having an exemplary imager controller 280 is shown and discussed in connection with FIG. 8. The exemplary imager controller 280 has the capability to process print jobs 290 of hybrid mix format PDL and raster data. For example, the image controller 280 can accommodate fully rasterized data, PDL data, TIFF and JFIF, PJL wrapped image/raster data, PDL encapsulated image/raster data, RAW raster (i.e. not fully RIP'd), and/or mix PDL/Raster. These formats are discussed in more detail in U.S. patent application Ser. No. 10/787,365 (now U.S. Publication No. 2005/0190397) and U.S. patent application Ser. No. 10/909,221 (now U.S. Pat. No. 7,551,299), both of which have been assigned to the assignee of the present invention, the disclosures of which are herein incorporated by reference.

In the imager controller 280, image/raster (i.e. bitmap) data, regardless of its source or degree of rasterization, is processed by a common image/raster processing pipeline, which is then coalesced back into a fully rasterized page. An additional advantage of this image/raster pipeline, is that upon entry, the bitmap data may be analyzed for the degree of rasterization (i.e. how complete the rasterization is to be compatible with the marking engine 214) and the raster/image data enters the pipeline at the appropriate stage to complete the rasterization (i.e. multi-entry point pipeline), instead of entering at the top of the pipeline.

Figure 8:
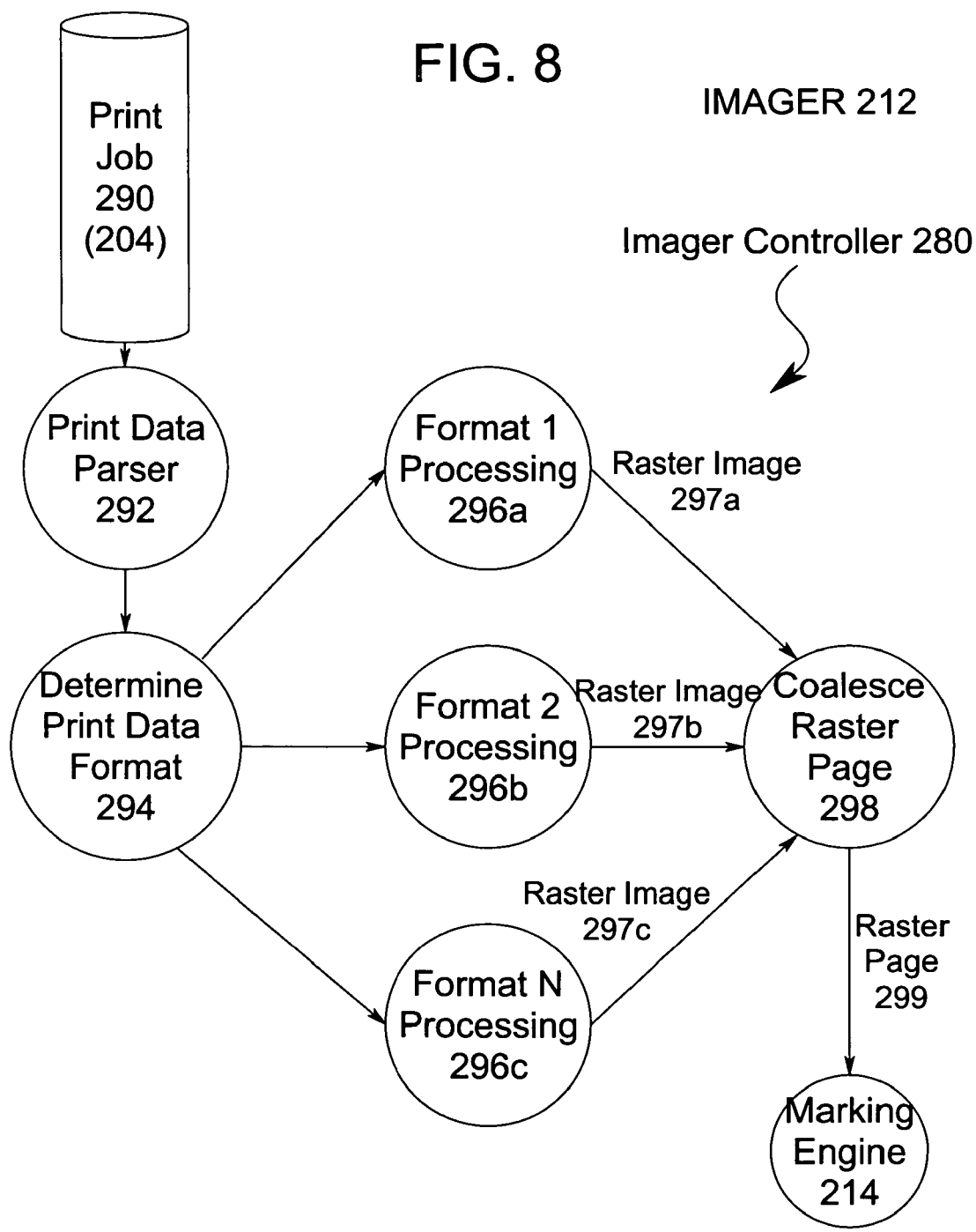
FIG. 8 is a schematic diagram of an exemplary embodiment of an imager particularly suited to imaging the hybrid raster and PDL format output generated by the adaptive print driver of the present invention.

Turning to FIG. 8, a print job 290 is input to the print data parser 292. The print data parser 292 and the format controller 294 review the printing instructions and identify a data format. The format controller 294 also acts as a director, passing appropriate subsections according to their data format to the appropriate format processor 296a, 296b, 296c. Each format processor 296a, 296b, 296c then handles the data. For example, format processor 296a could convert its input into raster image 297a (that may be specific to the marking engine 214), format processor 296b could convert its input into raster image 297b, and format processor 296c could convert its input into raster image 297c. The raster images 297a, 297b, 297c are then input into and coalesced by coalescer 298. The coalescer 298 coalesces the raster images 297a, 297b, 297c into raster pages 299. The raster pages 299 are then passed to the marking engine 214 for printing.

It should be noted that an additional imager having an exemplary imager controller is disclosed in U.S. patent application Ser. No. 10/909,221 (now U.S. Pat. No. 7,551,299), which is assigned to the assignee of the present invention, the disclosure of which is incorporated herein by reference. Like the imager 212, the imager in this reference would be particularly well suited to receiving input from the adaptive print driver 260 of the present invention.

It should be noted that the present invention does not require any action by the imager 112, 212. In other words, the imager 112, 212 can be completely passive. This is one of the reasons that the present invention can work with any imager 112, 212.

Exemplary Scenarios

In a first exemplary scenario, the adaptive print driver 260 may make the data format determination to send text and line art as PDL data, low complexity bitmaps as fully rasterized data, and high complexity bitmaps as partially rasterized data (i.e. image data).

A second exemplary scenario begins as the first exemplary scenario. However, as pages are generated, the adaptive print driver 260 may detect that the load on the host 210 has increased substantially (e.g. other processes have been initiated) and may make the data format determination to increase the amount of PDL data versus raster/image data on subsequent pages until the load on the host 210 decreases below some threshold.

Figure 11:
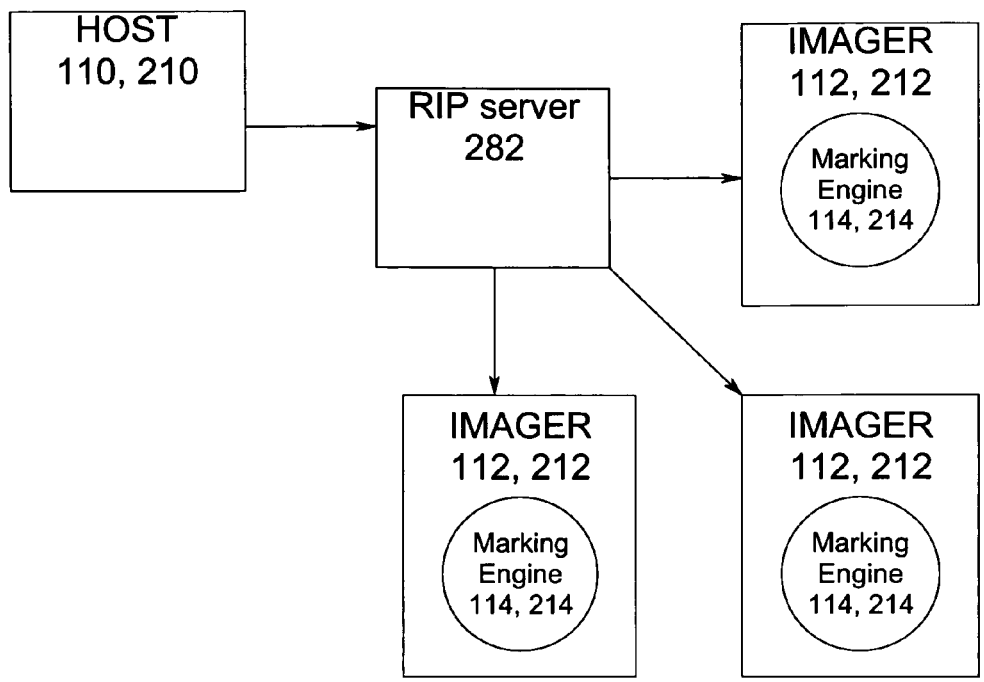
FIG. 11 is a block diagram showing an exemplary RIP server servicing multiple imagers, each with its own print engine.
Figure 12:
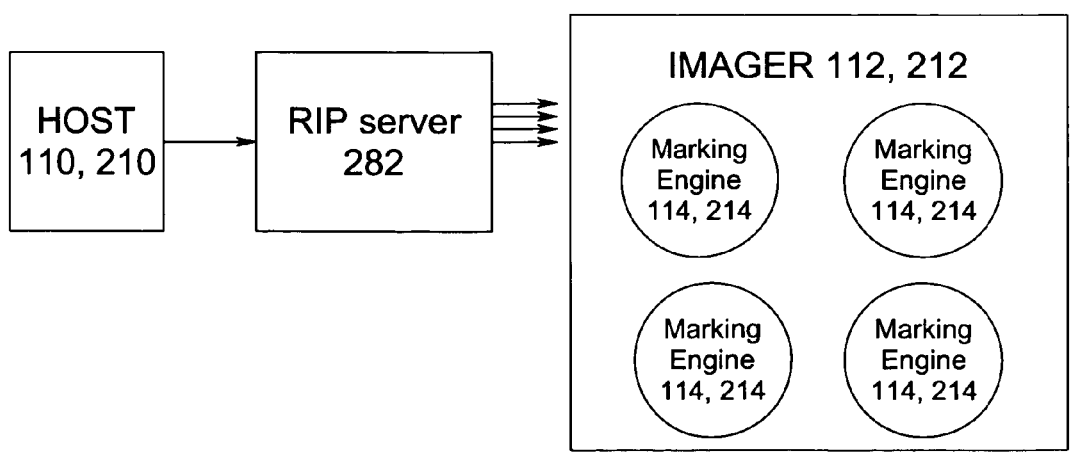
FIG. 12 is a block diagram showing an exemplary RIP server servicing a single imager with multiple marking engines.
Figure 13:
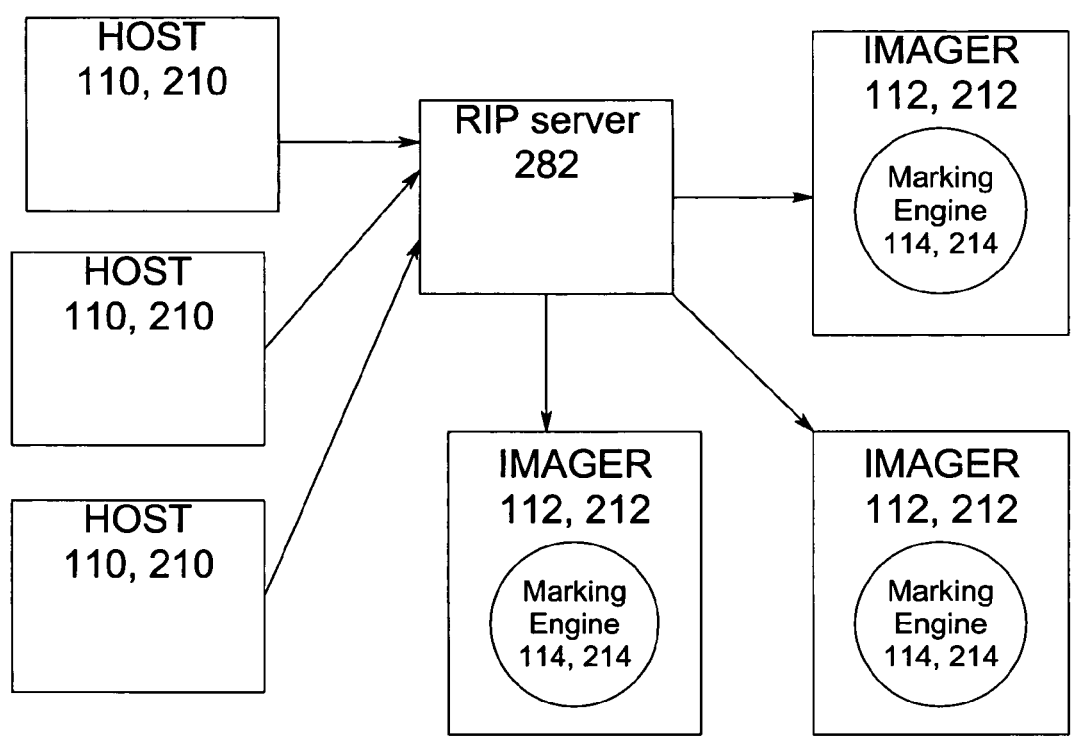
FIG. 13 is a block diagram showing multiple hosts providing input into an exemplary RIP server.

In a third exemplary scenario, involves implementations of the present invention that include a RIP server 282. The RIP server 282 may be any intermediary device between the printer driver (not shown) of the host 110, 210 and the image controller 280 of the imager 112, 212. Depending on the specifics of the host, imager, network, and the RIP server 282 itself, the RIP server 282 may perform at least some of the functions of the adaptive print driver 260 or it could perform all the functions of the adaptive print driver 260. The RIP server 282 may also function as a plurality of adaptive print drivers 260. The RIP server 282 may be physically located within the host 110, 210, within the imager 112, 212, or as a standalone device. FIG. 11 shows an embodiment in which the RIP server 282 services multiple imagers 212, each with its own print engine 214. FIG. 12 shows an embodiment in which the RIP server 282 services a single imager 212 with multiple marking engines 214. FIG. 13 shows an embodiment in which multiple hosts 110, 210 provide input into the RIP server 282. Using any of these embodiments, in this scenario, the RIP server 282 is performing parallel RIPs for multiple print engines 214. As pages are generated, the adaptive print driver 260 may detect that the load on the RIP server 282 has increased substantially (e.g. other RIPs started) and may decide to decrease the amount of PDL data vs. raster/image data on subsequent pages until the load on the RIP server 282 decreases below some threshold.

In another embodiment, the adaptive print driver 260 is a direct submit application (i.e. direct print). In this form of printing the document data 202 can be submitted directly to the direct submit application without conversion into a device independent format 206. In this system the direct submit application may otherwise perform the same function as described for the adaptive print driver 260. In this form of printing, the document data 202 can be submitted directly to the imager 212 (i.e. native format) without conversion by an adaptive print driver 260. In this system, the direct submit application may alternately perform some rasterization of any bitmap data contained in the document/image data, while still in its native format.

Miscellaneous

U.S. patent application Ser. No. 10/909,221 (now U.S. Pat. No. 7,551,299) discuses partially rasterized imaging data as being rasterized up to various stages of a rasterization pipeline as follows:

A rasterization pipeline in a printer controller is decomposed into distinct phases or stages. For example, the rasterization pipeline may be decomposed into decoding, rotation/resizing, image enhancement, color conversion, and half-toning stages. An improved pipeline architecture supports entry into any of these pipeline stages directly from a top-level sniffer (i.e., image/raster formats), PJL interpreter (i.e., PJL wrapped image/raster data) or PDL interpreter (i.e., PDL encapsulated image/raster data). This is referred to as a multi-entry point rasterization pipeline. The multi-entry point pipeline architecture allows processing tradeoffs between a host system and a printing device anywhere in the rasterization pipeline. The rasterization pipeline is alternatively referred to as a raster/image imaging pipeline since both raster formatted print data and image formatted print data can both be processed.

The printer controller accepts imaging data that has been partially rasterized up to any of the rasterization pipeline stages. Efficiency is achieved by recognizing which stage imaging data has been partially rasterized, for example, by a host. The printer controller then bypasses the completed rasterization stages and enters the rasterization pipeline at the next sequential stage.

It should be understood that a "dynamic process" is a flexible or changeable process. A dynamic process is not fixed or predetermined.

It should be noted that the ability of the adaptive print driver 260 to query the imager 212 could be achieved using any known means including, but not limited to networking, SNMP, SOAP/XML, and/or PGL INFO/USTATUS.

It should be noted that the present invention may be implemented with any type of host side print subsystem including those found in the MS WINDOWS® operating system, the Apple Macintosh Operating System, the Linux Operating System, the System V Unix Operating Systems, the BSD Unix Operating Systems, the OSF Unix Operating Systems, the IBM Mainframe MVS Operating System, and/or the IBM AS/400.

It should be noted that the 200 series numbering (e.g. host 210 and imager 212) may be prior art devices having added and/or modified software and/or hardware.

The terms and expressions that have been employed in the foregoing specification are used as terms of description and not of limitation, and are not intended to exclude equivalents of the features shown and described or portions of them. The scope of the invention is defined and limited only by the claims that follow.

What is claimed is:

1. A method for preparing a document for imaging on an imager, said method comprising the steps of:
  (a) receiving document data on an adaptive print driver of a host;
  (b) balancing rasterization on said adaptive print driver to achieve a load balance between rasterization to take place on said host and rasterization to take place on said imager, said balancing step comprising a plurality of considering steps including considering the complexity of said document and at least one consideration step selected from the group of considering steps consisting of:
    (i) considering performance capabilities of said host;
    (ii) considering performance capabilities of said imager;
    (iii) considering load capacity of said host; and
    (iv) considering load capacity of said imager;
  (c) dynamically at least partially rasterizing said document data on said adaptive print driver of said host, said step of dynamically at least partially rasterizing comprising at least one of the group of steps consisting of:
    (i) converting device independent data into a bitmap,
    (ii) resizing;
    (iii) rotating;
    (iv) color converting;
    (v) image enhancing; and
    (vi) half-toning; and (d) outputting print data pages to said imager having a printer controller with a multi-entry point rasterization pipeline, said printer controller capable of accepting imaging data that has been partially rasterized up to any stage in said multi-entry point rasterization pipeline, said multi-entry point rasterization pipeline having a plurality of stages selected from the group consisting of a decoding stage, a rotation stage, a resizing stage, an image enhancement stage, a color conversion stage, and a half-toning stage.

2. The method of claim 1 further comprising the steps of:
(a) receiving and parsing said document data to create parsed print instructions;
(b) assigning a data format to said parsed print instructions;
(c) transferring said parsed print instructions according to said data format to a plurality of format generators;
(d) generating print data from said parsed print instructions on each of said plurality of format generators according to said data format; and
(e) coalescing said print data into a print data unit.

3. The method of claim 1 further comprising the step of repeating step (b) at intervals selected from the group of intervals consisting of:
(a) a single time;
(b) upon initiation of each print job;
(c) repetitively throughout the print job on a periodic basis;
(d) repetitively throughout the print job on an event basis; and
(e) repetitively throughout the print job on a random basis.

4. The method of claim 1 further comprising the steps of:
(a) receiving and parsing said document data to create parsed print instructions;
(b) assigning a chosen data format to said parsed print instructions;
(c) transferring said parsed print instructions assigned a partially rasterized data format to a partially rasterizing format generator, and transferring said parsed print instructions assigned said at least one additional data format according to said data format to at least one additional format generator selected from the group consisting of:
(i) a hybrid mix format PDL format generator;
(ii) a raster data format generator; and
(iii) a PDL instructions format generator;
(d) generating print data from said parsed print instructions on each of a plurality of format generators according to said data format; and
(e) coalescing said print data.

5. The method of claim 1 further comprising the step of dynamically choosing a data format from a partially rasterized data format, wherein said partially rasterized data format is a data format in which some degree of full rasterization is performed, said full rasterization including conversion of device independent data into a bitmap, resizing said bitmap, rotating said bitmap, color conversion, image enhancements, and half-toning.

6. The method of claim 1 further comprising the step of dynamically choosing a data format of said print data page from a plurality of data formats selected from the group consisting of:
(a) hybrid mix format PDL;
(b) raster data;
(c) PDL instructions; and
(d) partially rasterized data.

7. The method of claim 1 further comprising the step of repeating step (b) on a degree of granularity selected from the group of granularities consisting of:
(a) a print job basis;
(b) a page basis;
(c) a segment/band basis;
(d) a graphical instruction class basis;
(e) a graphical instruction within a class basis; and
(f) a graphical instruction operand attribute basis.

8. A method for preparing a document for imaging on an imager using an adaptive print driver on a host, said method comprising the steps of:
(a) receiving and parsing document data to create parsed print instructions and assigning a data format to said parsed print instructions;
(b) considering complexity of said document;
(c) performing at least one consideration step selected from the group of considering steps consisting of:
(i) considering performance capabilities of said host;
(ii) considering performance capabilities of said imager;
(iii) considering load capacity of said host; and
(iv) considering load capacity of said imager;
(d) dynamically at least partially rasterizing said document data on said adaptive print driver of said host, said step of dynamically at least partially rasterizing comprising at least one of the group of steps consisting of:
(i) converting device independent data into a bitmap,
(ii) resizing;
(iii) rotating;
(iv) color converting;
(v) image enhancing; and
(vi) half-toning;
(e) transferring said parsed print instructions according to said data format to a plurality of format generators;
(f) generating print data from said parsed print instructions on each of said plurality of format generators according to said data format;
(g) coalescing said print data into a print data unit; and
(h) outputting print data pages to said imager having a printer controller with a multi-entry point rasterization pipeline, said printer controller capable of accepting imaging data that has been partially rasterized up to any stage in said multi-entry point rasterization pipeline, said multi-entry point rasterization pipeline having a plurality of stages selected from the group consisting of a decoding stage, a rotation stage, a resizing stage, an image enhancement stage, a color conversion stage, and a half-toning stage.

9. The method of claim 8 further comprising the step of repeating steps (b)-(d) at intervals selected from the group of intervals consisting of:
(a) a single time;
(b) upon initiation of each print job;
(c) repetitively throughout the print job on a periodic basis;
(d) repetitively throughout the print job on an event basis; and
(e) repetitively throughout the print job on a random basis.

10. The method of claim 8, said step of transferring said parsed print instructions according to an assigned data format to a plurality of format generators further comprising transferring said parsed print instructions assigned a partially rasterized data format to a partially rasterizing format generator, and transferring said parsed print instructions assigned said at least one additional data format according to said data format to at least one additional format generator selected from the group consisting of:
(a) a hybrid mix format PDL format generator;
(b) a raster data format generator; and
(c) a PDL instructions format generator.

11. The method of claim 8 further comprising the step of dynamically choosing a data format from a partially rasterized data format, wherein said partially rasterized data format is a data format in which some degree of full rasterization is performed, said full rasterization including conversion of device independent data into a bitmap, resizing said bitmap, rotating said bitmap, color conversion, image enhancements, and half-toning.

12. The method of claim 8 further comprising the step of dynamically choosing a data format of said print data page from a plurality of data formats selected from the group consisting of:
   (a) hybrid mix format PDL;
   (b) raster data;
   (c) PDL instructions; and
   (d) partially rasterized data.

13. The method of claim 8 further comprising the step of repeating steps (b)-(d) on a degree of granularity selected from the group of granularities consisting of:
   (a) a print job basis;
   (b) a page basis;
   (c) a segment/band basis;
   (d) a graphical instruction class basis;
   (e) a graphical instruction within a class basis; and
   (f) a graphical instruction operand attribute basis.

14. An adaptive print driver for receiving printing instructions relating to a document and outputting print data pages to an imager, said adaptive print driver comprising:
   (a) a printing instruction parser for receiving and parsing said printing instructions to create parsed print instructions;
   (b) a format controller for receiving said parsed print instructions from said printing instruction parser, assigning a data format to said parsed print instructions, and transferring said parsed print instructions according to said data format to a plurality of format generators, wherein the data format can be dynamically chosen from a plurality of data formats including a partially rasterized data format and at least one additional data format selected from the group consisting of:
      (i) a hybrid mix format PDL format;
      (ii) a raster data format; and
      (iii) a PDL instructions format;
   (c) said adaptive print driver using a data format determination analysis on a degree of granularity;
   (d) said plurality of format generators, each format generator for receiving said parsed print instructions from said format controller according to data format, each format generator generating print data from said received parsed print instructions, at least one format generator for receiving said parsed print instructions from said format controller according to its partially rasterized data format for the purpose of at least partially rasterizing selected from at least one of the group of:
      (i) converting device independent data into a bitmap,
      (ii) resizing;
      (iii) rotating;
      (iv) color converting;
      (v) image enhancing; and
      (vi) half-toning;
   (e) a coalescer receiving print data from said plurality of format generators and coalescing said received print data; and
   (f) at least one of said printing instruction parser, said format controller, said plurality of format generators, and said coalescer is implemented as a software module located in local and/or remote non-transitory memory storage devices;
   (g) wherein coalesced print data is output to said imager having a printer controller with a multi-entry point rasterization pipeline, said printer controller capable of accepting imaging data that has been partially rasterized up to any stage in said multi-entry point rasterization pipeline, said multi-entry point rasterization pipeline having a plurality of stages selected from the group consisting of a decoding stage, a rotation stage, a resizing stage, an image enhancement stage, a color conversion stage, and a half-toning stage.

15. The adaptive print driver of claim 14, said adaptive print driver using a data format determination analysis process to balance rasterization on said adaptive print driver to achieve a load balance between rasterization to take place on said adaptive print driver and rasterization to take place on said imager.

16. The adaptive print driver of claim 14, said adaptive print driver on a host, said adaptive print driver using a data format determination analysis, and in said data format determination analysis, said printing instruction parser considering complexity of said document and at least one of the following:
   (a) performance capabilities of said host;
   (b) performance capabilities of said imager;
   (c) load capacity of said host; and
   (d) load capacity of said imager.

17. The adaptive print driver of claim 14, said adaptive print driver using a data format determination analysis at intervals selected from the group of intervals consisting of:
   (a) a single time;
   (b) upon initiation of each print job;
   (c) repetitively throughout the print job on a periodic basis;
   (d) repetitively throughout the print job on an event basis; and
   (e) repetitively throughout the print job on a random basis.

18. The adaptive print driver of claim 14, wherein said printing instructions may have a format selected from the group consisting of:
   (a) document data;
   (b) device independent data generated from said document data; and
   (c) proprietary formatted data generated from said document data.

19. The adaptive print driver of claim 14, said format controller transferring said parsed print instructions assigned a partially rasterized data format to a partially rasterizing format generator, and transferring said parsed print instructions assigned said at least one additional data format according to said data format to at least one additional format generator selected from the group consisting of:
   (a) a hybrid mix format PDL format generator;
   (b) a raster data format generator; and
   (c) a PDL instructions format generator.

20. The adaptive print driver of claim 14, said partially rasterized data format being a data format in which some degree of full rasterization is performed, said full rasterization including conversion of device independent data into a bitmap, resizing said bitmap, rotating said bitmap, color conversion, image enhancements, and half-toning.

21. The adaptive print driver of claim 14, said degree of granularity selected from the group of granularities consisting of:
   (a) a print job basis;
   (b) a page basis;
   (c) a segment/band basis;
   (d) a graphical instruction class basis;
   (e) a graphical instruction within a class basis; and
   (f) a graphical instruction operand attribute basis.

* * * * *